United States Patent
Motohashi

(10) Patent No.: US 8,840,068 B2
(45) Date of Patent: *Sep. 23, 2014

(54) CLOSING MEMBER FOR OPENING

(75) Inventor: Hideto Motohashi, Aichi (JP)

(73) Assignee: Mitsubishi Aircraft Corporation, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/577,733

(22) PCT Filed: Feb. 9, 2011

(86) PCT No.: PCT/JP2011/000714
§ 371 (c)(1),
(2), (4) Date: Sep. 27, 2012

(87) PCT Pub. No.: WO2011/099275
PCT Pub. Date: Aug. 18, 2011

(65) Prior Publication Data
US 2013/0015294 A1 Jan. 17, 2013

(30) Foreign Application Priority Data
Feb. 10, 2010 (JP) ................................. 2010-027671

(51) Int. Cl.
B64C 1/14 (2006.01)
B64D 45/02 (2006.01)
B64C 3/34 (2006.01)
B64D 37/32 (2006.01)

(52) U.S. Cl.
CPC . *B64C 3/34* (2013.01); *B64D 45/02* (2013.01); *B64D 37/32* (2013.01)
USPC .................................................... 244/129.4

(58) Field of Classification Search
USPC ................... 244/119, 129.3–129.5; 52/784.1, 52/784.13, 784.15, 717.01
See application file for complete search history.

(56) References Cited

U.S. PATENT DOCUMENTS

| 4,428,867 A | 1/1984 | Billias et al. |
| 4,530,443 A | 7/1985 | Gorges |

(Continued)

FOREIGN PATENT DOCUMENTS

| JP | 09-133117 A | 5/1997 |
| JP | 2002-528278 A | 9/2002 |
| WO | 2009-003954 A1 | 1/2009 |

OTHER PUBLICATIONS

International Preliminary Report for Patentability for PCT/JP2011/000714; Feb. 9, 2011.

(Continued)

*Primary Examiner* — Philip J Bonzell
(74) *Attorney, Agent, or Firm* — Pearne & Gordon LLP

(57) ABSTRACT

An object of the invention is to provide a low-cost closing member for an opening having an excellent lightning protection capability. In a door body 30, an outer surface 31a of a plate part 31 is formed by a composite material layer 60, and a side of an inner surface 31b and a flange part 32 are formed by a metallic material layer 61. The door body 30, a clamp ring 40, and an opening 12 of a wing panel 11 are electrically connected by surface bonding of conductive materials in a butt section of an abutment surface 34 of the door body 30 and a tapered surface 40c of the clamp ring 40 and a butt section of a tapered surface 40d of the clamp ring 40 and an abutment surface 14 of the opening 12.

9 Claims, 2 Drawing Sheets

(56) References Cited

U.S. PATENT DOCUMENTS

| | | | | |
|---|---|---|---|---|
| 4,579,248 | A | * | 4/1986 | Gorges .................... 220/327 |
| 8,016,235 | B2 | * | 9/2011 | Ramirez Blanco et al. .. 244/119 |
| 8,141,820 | B2 | * | 3/2012 | Zuniga Sagredo ......... 244/129.4 |
| 8,443,575 | B1 | * | 5/2013 | Tanner et al. ............... 52/784.1 |
| 2007/0207421 | A1 | | 9/2007 | Heeter |
| 2009/0166473 | A1 | * | 7/2009 | Zuniga Sagredo ......... 244/129.4 |
| 2009/0294591 | A1 | * | 12/2009 | Ramirez Blanco et al. ............. 244/129.4 |

OTHER PUBLICATIONS

Niu, M.C-Y. "Airframe Structural Design: Practical Design Information and Data on Aircraft Structures." Conmilit Press Ltd., Hong Kong; 1988; p. 265, Fig. 8.3.16 (XP009158193).

International Search Report for PCT/JP2011/000714; Mar. 22, 2011.

Japanese Office action for Application No. 2010-027671 dated Aug. 26, 2013.

* cited by examiner

CLOSING MEMBER FOR OPENING

TECHNICAL FIELD

The present invention relates to a closing member for an opening provided in an airframe of an aircraft.

BACKGROUND ART

Wing panels constituting wing surfaces are mounted above and below beam members, thereby assembling a main wing of the aircraft into a hollow structure. Generally an internal space of the main wing is used as a fuel tank.

An opening is formed in the surface of the main wing in order to perform inspection, maintenance and the like of an inside of the fuel tank. The opening is normally closed by an access door, and the access door is opened in performing the inspection, maintenance and the like (for example, see Non-Patent Document 1).

The access door includes a door body that is disposed on an internal space side of the main wing with respect to the opening and a clamp ring that is disposed on an external side of the main wing with respect to the opening.

Each of the door body and the clamp ring has an external dimension larger than that of the opening. The door body and the clamp ring are tightened by a fastener member and the like while an edge portion of the opening is held between an outer circumferential portion of the door body and an outer circumferential portion of the clamp ring, whereby the opening is closed by the door body.

CITATION LIST

Non-Patent Document

Non-Patent Document 1: "Airframe Structural Design", Michael C. Y. Niu, Conmilit Press Ltd., Hong Kong, 1988, p. 265, Fig. 8.3.16

SUMMARY OF THE INVENTION

Technical Problems to be Solved by the Invention

In recent years, there has been studied use of a composite material including a carbon fiber, for the main wing of the aircraft. In the case that the main wing is made of the conventional metallic material, even if lightning strikes the access door, a lightning current is passed from the access door to the wing panel of the main wing to diffuse. However, in the case that the main wing is made of the composite material, when the lightning strikes the access door directly, the current hardly diffuses, and possibly an arc discharge is generated in an outer circumferential portion of the access door. Therefore, it is necessary to securely take a countermeasure against the lightning.

Because the outer circumferential portions of the door body and the clamp ring are tightened by the many fastener members, it is necessary to form receiving parts for the fastener member on the door body side. The door body has a highly complicated shape when the many receiving parts for the fastener members are provided in the outer circumferential portion of the door body. Unfortunately the door body having the complicated shape is hardly made of the composite material, and leads to high cost.

A small amount of current is passed through the composite material in which the carbon fiber is used. In order to prevent electric isolation of the access door it is necessary to establish electrical bonding between the access door and the wing panel irrespective of a kind of the material for the access door.

In the case that the airframe of the aircraft is made of the carbon fiber composite material, when the electrical bonding is tried to be established at a contact surface, in order to avoid galvanic corrosion at the contact surface, the materials for the door body and the clamp ring are restricted to an titanium alloy, CRES (stainless alloy), and the like, which are considered as the metal of similar electrode potential as the carbon fiber composite material. However, both the titanium alloy and CRES (stainless alloy) are a hardly-machinable material, the titanium alloy is expensive, and CRES has high specific gravity to lead to an increase in weight.

These problems are common to other openings provided in the airframe of the aircraft.

The invention is devised in view of the technical problems described above, and an object of the invention is to provide a closing member for an opening, which can be produced at low cost while having the excellent lightning protection capability.

Solution to the Problems

To achieve the above object, the present invention provides a closing member for an opening that is formed in a panel constituting an outer surface of an airframe of an aircraft, the closing member includes: a closing member body that is disposed on one surface side of the panel to close the opening, the closing member body having an external diameter larger than that of the opening; a ring-shaped clamp member that is disposed on the other surface side of the panel, the clamp member having an external diameter larger than that of the opening; and a fastener that tightens the closing member body and the clamp member while the panel is held between an outer circumferential portion of the closing member body and an outer circumferential portion of the clamp member. In the closing member body, a surface thereof that is to be located on an outward of the airframe is made of a composite material including a carbon fiber, a surface facing an inward of the airframe is made of a metallic material, and an outer circumferential portion of a first layer made of the composite material and an inner circumferential portion of the clamp member abut on each other, and the outer circumferential portion of the clamp member and an inner edge portion of the opening abut on each other, whereby the closing member is electrically connected to the panel through the clamp member.

As described above, in the closing member body, the surface thereof that is to be located on the outward of the airframe is made of the composite material including the carbon fiber, so that the current can be passed to the clamp member and the panel around the opening through the carbon fiber when the lightning strikes the closing member body directly.

In the closing member body, the section that contacts the panel constituting the outer surface of the airframe is made of the same carbon fiber composite material as that of the panel, so that the electrical bonding can be established lower in cost and lighter in weight compared with the use of the metal, such as titanium and CRES, which has the similar electrode potential as the carbon fiber composite material.

The surface facing the inward of the airframe is made of the metallic material, so that the complicated-shape part such as the receiving part for the fastener can be formed by casting or mechanical machining.

Preferably, an abutment surface of the outer circumferential portion of the first layer and the inner circumferential portion of the clamp member and an abutment surface of the outer circumferential portion of the clamp member and the inner edge portion of the opening constitute a tapered surface that is tilted with respect to a direction orthogonal to the airframe surface. Thereby, cut surfaces of the carbon fibers can be butted to securely establish the electrical bonding.

In the closing member body, an insulating layer is provided between the first layer made of the composite material and a second layer made of the metallic material. Thereby, even if the lightning strikes the first layer, the current does not reach the second layer, thus the generation of the spark can be prevented on the second layer side.

Preferably, the first layer and the second layer are integrally joined by a pin and/or an adhesive agent.

In the clamp ring, at least a side thereof that is to be located on an outward side of the airframe is preferably made of one of a titanium alloy, a stainless alloy, and a composite material including a carbon fiber. Corrosion due to a potential difference is hardly generated because these materials have the similar electrode potential as the composite material used for the closing member body.

The panel may be made of a composite material including a carbon fiber.

The opening in which the closing member is provided may be used for any application and may have any configuration. Because the generation of the arc discharge can be prevented, preferably the opening is provided in a main wing constituting the airframe, and the opening is an access to a fuel tank accommodated in the main wing.

Advantageous Effect of Invention

According to the invention, the closing member body surface that is to be located on the outward of the airframe is made of the composite material including the carbon fiber, which allows the current to be passed to the clamp member and the panel around the opening through the carbon fiber when the lightning strikes the closing member body directly. As a result, the closing member has the excellent lightning protection capability.

Additionally, the complicated-shape parts such as the receiving part that fixes the closing member body can be formed at low cost since the closing member body surface facing the inward of the airframe is made of the metallic material.

DESCRIPTION OF EMBODIMENTS

Hereinafter, an embodiment of the invention will be described in detail with reference to the accompanying drawings.

Figure 1:
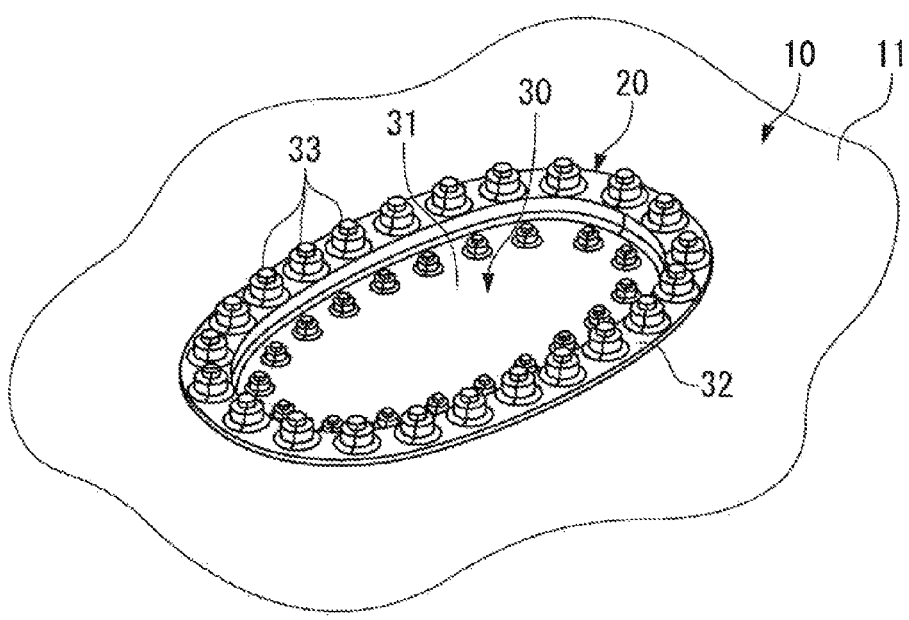
FIG. 1 is a perspective view illustrating an access door provided in a main wing of an aircraft in an embodiment.

FIG. 1 is a perspective view illustrating access door (closing member) 20 that is provided in a main wing 10 of an airframe of an aircraft, to which a closing member for an opening according to an embodiment is applied, when viewed from an inside of the main wing 10.

In order that a maintenance worker goes in and out of a fuel tank provided in an internal space of the main wing 10, the access door 20 is provided in a wing panel (panel) 11 that constitutes a surface on an upper side or a lower side of the main wing 10.

Figure 2:
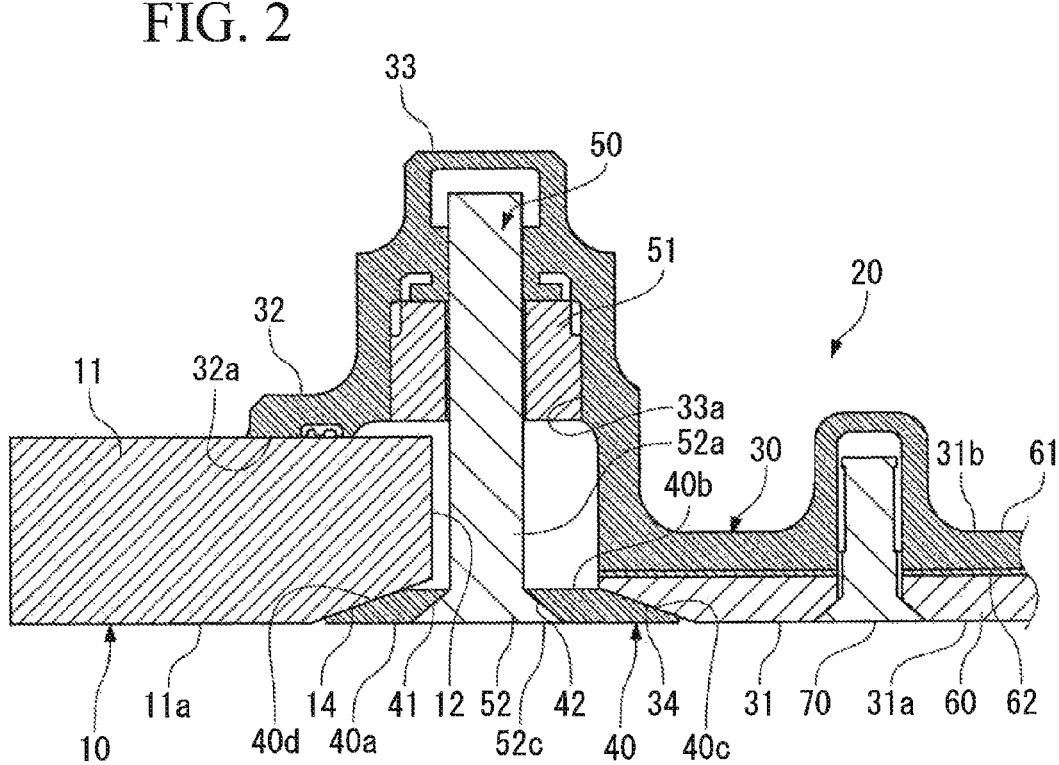
FIG. 2 is a sectional view illustrating an installation structure of the access door to a wing panel of the main wing.

As illustrated in FIG. 2, an opening 12 that communicates an inside and an outside of the main wing 10 to each other is formed in the wing panel 11. For example, the opening 12 has a proper shape such as an elongated circular shape, an elliptic shape, and a circular shape.

The access door 20 includes a door body (closing member body) 30 that is disposed on an internal space side of the main wing 10 with respect to the opening 12, a clamp ring (clamp member) 40 that is disposed on an external side of the main wing 10 with respect to the opening 12, and a fastener member (fastener) 50 that tightens the door body 30 and the clamp ring 40.

The door body 30 has an external dimension larger than that of the opening 12. The door body 30 includes a plate part 31 and a flange part 32. The plate part 31 includes an outer surface 31a that is formed flush with a wing outer surface 11a of the wing panel 11, and the plate part 31 has an external dimension smaller than that of the opening 12. The flange part 32 is integrally formed in an outer circumferential portion of the plate part 31, and the flange part 32 abuts on a surrounding area of the opening 12 on the internal space side of the main wing 10.

The flange part 32 includes an abutment surface 32a and a receiving part 33 for the fastener member 50. The abutment surface 32a abuts on the surrounding area of the opening 12 on the internal space side of the main wing 10. On the inside of the abutment surface 32a, the receiving part 33 is formed in a section facing the clamp ring 40.

Along a circumferential direction in the outer circumferential portion of the door body 30, the plural receiving parts 33 are provided according to positions in which the fastener members 50 are placed.

Each receiving part 33 is projected toward the internal space side of the main wing 10, and a recess 33a that is opened onto the side facing the clamp ring 40 is formed in the receiving part 33. A shank part 52a of the fastener body 52 constituting the fastener member 50 is accommodated in the recess 33a while a nut 51 constituting the fastener member 50 is retained in the recess 33a.

The ring-shaped clamp ring 40 has an outer diameter larger than an internal diameter of the opening 12 and an inner diameter smaller than the internal diameter of the opening 12. The clamp ring 40 has a quadrangular shape in section, an outer surface 40a that constitutes the outside of the main wing 10 is formed flush with the wing outer surface 11a of the wing panel 11, and an facing surface 40b facing the receiving part 33 of the door body 30 is formed in parallel to the outer surface 40a.

The clamp ring 40 includes a through-hole 41 that penetrates the outer surface 40a and the facing surface 40b in a position corresponding to the receiving part 33 of the door body 30. The shank part 52a of the fastener member 50 is inserted into each through-hole 41. In each through-hole 41, a tapered seating surface 42 in which a head part 52c of the fastener member 50 is accommodated is formed on the outer surface side of the main wing 10.

In the embodiment, the clamp ring 40 has a trapezoidal shape in section, and tapered surfaces 40c and 40d are formed between the outer surface 40a and the facing surface 40b. The tapered surfaces 40c and 40d are tilted such that a distance gap between the tapered surfaces 40c and 40d are gradually increased from the side of the facing surface 40b toward the side of the outer surface 40a.

An abutment surface 34 that abuts on the tapered surface 40c on an inner circumferential side of the clamp ring 40 is formed in the outer circumferential portion of the plate part 31. In the embodiment, the abutment surface 34 is formed while tilted at an angle corresponding to the tapered surface 40c of the clamp ring 40 such that an external diameter of the plate part 31 is gradually increased from the outer surface 31a toward the side of the inner surface 31b oriented toward the inside of the main wing 10.

An abutment surface 14 that abuts on the tapered surface 40d on an outer circumferential side of the clamp ring 40 is formed in the inner circumferential portion of the opening 12 of the wing panel 11. In the embodiment, the abutment surface 14 is formed while tilted at an angle corresponding to the tapered surface 40d of the clamp ring 40.

In the access door 20, an inner edge portion of the opening 12 is held between the clamp ring 40 and the abutment surface 32a of the flange part 32 of door body 30 in a state in which the opening 12 is closed. The fastener body 52 of the fastener member 50 is inserted into the through-hole 41 of the clamp ring 40 from the outside of the main wing 10, and the shank part 52a is screwed in the nut 51, thereby tightening the door body 30 and the clamp ring 40.

At this point, the abutment surface 14 of the opening 12 abuts on the tapered surface 40d of the clamp ring 40, and the tapered surface 40c of the clamp ring 40 abuts on the abutment surface 34 of the plate part 31 of the door body 30.

In the embodiment, the outer surface 31a of the plate part 31 in the door body 30 is formed by a composite material layer (first layer) 60 made of a CFRP including a carbon fiber, while the inner surface 31b side of the plate part 31 and the flange part 32 in the door body 30 are formed by a metallic material layer (second layer) 61 made of an aluminum alloy or the like. The composite material layer 60 and the metallic material layer 61 are integrally joined by an adhesive agent 62 made of, for example, an insulating epoxy material, thereby forming a stacked structure. The composite material layer 60 and the metallic material layer 61 may integrally be joined by a pin-shaped fastener (pin) 70, or the fastener 70 and the adhesive agent 62 may be combined. The fastener 70 may be tightened in the metallic material layer 61 by installing an insert or tapping.

In the composite material layer 60, an insulating film (not illustrated) is formed by curing a glass fiber reinforced plastic (insulating material) onto an adhesive surface side of the adhesive agent 62.

The metallic material layer 61 includes an insulating film (not illustrated) that is formed by painting the adhesive surface side of the adhesive agent 62 with the insulating material.

The insulating layer can be formed by the insulating film of the composite material layer 60, the adhesive agent 62, and the insulating film of the metallic material layer 61.

An outer circumferential end portion of the composite material layer 60 constitutes the abutment surface 34. Because the abutment surface 34 is the tilt surface, an end portion of the conductive carbon fiber provided in a direction along the surface of the main wing 10 is exposed to the abutment surface 34. The carbon fiber constitutes the composite material layer 60.

On the other hand, in the clamp ring 40, at least the side thereof that is to be located on the outward side of the airframe is made of a material, such as a titanium alloy and CRES, which has the similar electrode potential as the composite material layer 60, or the same CFRP (composite material) in which the carbon fiber is used as the composite material layer 60. In the case that the clamp ring 40 is made of the composite material, similarly to the abutment surface 34, the end portion of the conductive carbon fiber provided in the direction along the surface of the main wing 10 is exposed on the tapered surfaces 40c and 40d.

The end portion of the conductive carbon fiber constituting the wing panel 11 is also exposed on the abutment surface 14 of the opening 12 of the main wing 10 while the carbon fiber is provided in the direction along the surface of the main wing 10.

According to the above configuration, the door body 30, the clamp ring 40, and the opening 12 of the wing panel 11 are electrically connected by the surface bonding between the conductive materials in a butt section of the abutment surface 34 of the door body 30 and the tapered surface 40c of the clamp ring 40 and a butt section of the tapered surface 40d of the clamp ring 40 and the abutment surface 14 of the opening 12. Therefore, the lightning strikes the door body 30, the current diffuses from the composite material layer 60 of the door body 30 to the wing panel 11 through the clamp ring 40, so that a lightning protection capability can be improved.

In the door body 30, the outer surface 31a of the plate part 31 is formed by the composite material layer 60, the side of the inner surface 31b and the flange part 32 are formed the metallic material layer 61, and the composite material layer 60 and the metallic material layer 61 are insulated from each other by the insulating layer. Therefore, the current passed through the composite material layer 60 is not passed through the metallic material layer 61, thus the generation of the arc discharge can be prevented inside the fuel tank during the lightning strike.

At this point, because the surface contact is established between the abutment surface 34 of the door body 30 and the tapered surface 40c of the clamp ring 40 and between the tapered surface 40d of the clamp ring 40 and the abutment surface 14 of the opening 12, a large amount cut surface of the carbon fiber is exposed on the tapered surface 40d of the clamp ring 40 and the abutment surface 14 of the opening 12. Therefore, contact areas of the carbon fibers are increased between the tapered surface 40d of the clamp ring 40 and the abutment surface 14 of the opening 12, and the tapered surface 40d of the clamp ring 40 and the abutment surface 14 of the opening 12 can securely be brought into contact with each other to ensure the electric conduction.

For example, it is assumed that the abutment surface 34 of the door body 30, the tapered surfaces 40c and 40d of the clamp ring 40, and the abutment surface 14 of the opening 12 are oriented normal to the direction in which the door body 30 and the clamp ring 40 are attached and detached, namely, on a plane parallel to the surfaces of the door body 30 or the wing panel 11. In this case, possibly the end portion of the carbon fiber, which is exposed to these surfaces, is frictioned and loosened after the door body 30 and the clamp ring 40 are repeatedly attached and detached. On the other hand, these surfaces are constructed by the tapered surfaces, whereby the carbon fiber can be prevented from being loosened.

Because the receiving part 33 of the fastener member 50 and the like are formed by the metallic material layer 61, they are more easily molded compared with the case in which the receiving part 33 and the like are made of the composite material. Therefore, the access door 20 can be formed at low cost.

In the embodiment, the door body 30 and the clamp ring 40 are described. There is no particular limitation to the tightening structure and the shapes or the like of the door body 30 and the clamp ring 40, but any other configuration may be adopted as appropriate.

Without departing from the scope of the invention, the configurations described in the embodiment can be appropriately selected or changed to another configuration.

REFERENCE SIGNS LIST 10 main wing
11 wing panel (panel)
12 opening
14 abutment surface
20 access door (closing member)
30 door body (closing member body)
31 plate part
31a outer surface
31b inner surface
32 flange part
33 receiving part
34 abutment surface
40 clamp ring (clamp member)
40a outer surface
40b facing surface
40c tapered surface
40d tapered surface
41 through-hole
50 fastener member (fastener)
60 composite material layer (first layer)
61 metallic material layer (second layer)
62 adhesive agent
70 fastener (pin)

The invention claimed is:

1. A closing member for an opening that is formed in a panel constituting an outer surface of an airframe of an aircraft, the closing member comprising:
   a closing member body configured to be disposed on one surface side of the panel to close the opening, the closing member body having an external diameter larger than that of the opening, the closing member body comprising a first layer defining a first surface of the closing member body and a second layer defining a second surface of the closing member body, wherein the first layer comprises a composite material including a carbon fiber and the second layer comprises a metallic material;
   a clamp member configured to be disposed on the other surface side of the panel, the clamp member having an external diameter larger than that of the opening; and
   a fastener configured to tighten the closing member body and the clamp member while the panel is held between an outer circumferential portion of the closing member body and an outer circumferential portion of the clamp member,
   wherein the closing member body is configured to be disposed such that the first surface faces an exterior of the airframe and the second surface faces an interior of the airframe, and
   an outer circumferential portion of the first layer and an inner circumferential portion of the clamp member abut on each other, and the outer circumferential portion of the clamp member and an inner edge portion of the opening abut on each other, whereby the closing member is electrically connected to the panel through the clamp member.

2. The closing member for an opening according to claim 1, wherein an abutment surface of the outer circumferential portion of the first layer and the inner circumferential portion of the clamp member and an abutment surface of the outer circumferential portion of the clamp member and the inner edge portion of the opening constitute a tapered surface that is configured to be tilted with respect to a direction orthogonal to the airframe surface when the clamp member and the closing member body are disposed.

3. The closing member for an opening according to claim 1, wherein, in the clamp member, at least a side thereof that is configured to be located on an outward side of the airframe is made of one of a titanium alloy, a stainless alloy, and a composite material including a carbon fiber.

4. The closing member for an opening according to claim 1, wherein the panel is made of a composite material including a carbon fiber.

5. The closing member for an opening according to claim 1, wherein the clamp member is ring-shaped.

6. The closing member for an opening according to claim 1, wherein, in the closing member body, an insulating layer is provided between the first layer made of the composite material and a second layer made of the metallic material.

7. The closing member for an opening according to claim 6, wherein the first layer and the second layer are integrally joined by a pin and/or an adhesive agent.

8. An aircraft comprising the closing member according to claim 1.

9. The aircraft according to claim 8, wherein the opening is provided in a main wing constituting the airframe, and the opening is an access to a fuel tank accommodated in the main wing.

* * * * *